(12) United States Patent
Chen et al.

(10) Patent No.: US 11,956,181 B2
(45) Date of Patent: *Apr. 9, 2024

(54) METHOD AND APPARATUS FOR SENDING SIGNAL, METHOD AND APPARATUS FOR RECEIVING SIGNAL, AND STORAGE MEDIUM

(71) Applicant: ZTE Corporation, Shenzhen (CN)

(72) Inventors: Yijian Chen, Shenzhen (CN); Zhaohua Lu, Shenzhen (CN); Chen Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 31 days.

This patent is subject to a terminal disclaimer.

(21) Appl. No.: 16/962,879

(22) PCT Filed: Dec. 14, 2018

(86) PCT No.: PCT/CN2018/121323
§ 371 (c)(1),
(2) Date: Jul. 17, 2020

(87) PCT Pub. No.: WO2019/141033
PCT Pub. Date: Jul. 25, 2019

(65) Prior Publication Data
US 2020/0351071 A1    Nov. 5, 2020

(30) Foreign Application Priority Data
Jan. 17, 2018    (CN) .......................... 201810046337.4

(51) Int. Cl.
*H04L 5/10*    (2006.01)
*H04L 5/00*    (2006.01)
(Continued)

(52) U.S. Cl.
CPC .............. *H04L 5/10* (2013.01); *H04L 5/0048* (2013.01); *H04L 27/261* (2013.01); *H04W 72/0446* (2013.01); *H04W 72/0453* (2013.01)

(58) Field of Classification Search
CPC ......... H04W 72/0453; H04W 72/0446; H04W 24/10; H04W 72/14; H04W 76/11;
(Continued)

(56) References Cited

U.S. PATENT DOCUMENTS

| 2015/0055632 A1 | 2/2015 | Gou | |
| 2015/0304997 A1* | 10/2015 | Park | H04J 11/00 370/330 |

(Continued)

FOREIGN PATENT DOCUMENTS

| CN | 102480342 A | 5/2012 |
| CN | 102638325 A | 8/2012 |

(Continued)

OTHER PUBLICATIONS

International Search Report for corresponding application PCT/CN2018/121323 filed Dec. 14, 2018; dated Mar. 4, 2019.

*Primary Examiner* — Oussama Roudani
(74) *Attorney, Agent, or Firm* — CANTOR COLBURN LLP

(57) ABSTRACT

Provided in the present disclosure are a method and apparatus for sending a signal, a method and apparatus for receiving a signal, and a storage medium. The method for sending the signal includes: configuring or appointing multiple sending manners or conflict processing manners for a first signal; when there is a second signal conflicting with the first signal, selecting a sending manner or a conflict processing manner for the first signal according to determination information; and sending the first signal according to the sending manner or the conflict processing manner.

19 Claims, 3 Drawing Sheets

(51) Int. Cl.
*H04L 27/26* (2006.01)
*H04W 72/0446* (2023.01)
*H04W 72/0453* (2023.01)

(58) Field of Classification Search
CPC ... H04L 5/0051; H04L 5/0062; H04L 5/0053; H04L 27/261; H04L 5/10; H04L 1/0693; H04B 17/24; H04B 17/327
See application file for complete search history.

(56) References Cited

U.S. PATENT DOCUMENTS

| | | | |
|---|---|---|---|
| 2016/0029351 A1* | 1/2016 | Shimezawa | H04L 5/0048 |
| | | | 370/329 |
| 2019/0052443 A1* | 2/2019 | Cheng | H04L 5/0023 |
| 2019/0109746 A1* | 4/2019 | Hosseini | H04W 72/20 |
| 2019/0141703 A1* | 5/2019 | Gupta | H04L 5/0048 |
| 2019/0149212 A1* | 5/2019 | Wang | H04W 72/0453 |
| | | | 370/329 |
| 2019/0165880 A1* | 5/2019 | Hakola | H04L 1/008 |
| 2020/0028640 A1* | 1/2020 | Yeo | H04L 5/0007 |
| 2021/0084663 A1* | 3/2021 | Takeda | H04L 5/0051 |
| 2021/0204320 A1* | 7/2021 | Frenne | H04L 5/005 |
| 2021/0258090 A1* | 8/2021 | Kwak | H04W 72/14 |

FOREIGN PATENT DOCUMENTS

| | | |
|---|---|---|
| CN | 105101446 A | 11/2015 |
| CN | 105262559 A | 1/2016 |
| CN | 108111278 A | 6/2018 |

* cited by examiner

METHOD AND APPARATUS FOR SENDING SIGNAL, METHOD AND APPARATUS FOR RECEIVING SIGNAL, AND STORAGE MEDIUM

CROSS-REFERENCE TO RELATED APPLICATION

The present application is based upon and claims priority to Chinese Patent Application No. 201810046337.4, filed on Jan. 17, 2018, the entire contents of which are incorporated herein by reference.

TECHNICAL FIELD

The present disclosure relates, but is not limited, to a method and apparatus for sending a signal, a method and apparatus for receiving a signal, and a storage medium.

BACKGROUND

In the 5th-Generation (5G) New Radio (NR) of the relevant art, there are a variety of Reference Signals (RSs) that may also be generally referred to as pilots. These pilots have respective functions. For example, downlink pilots include a Down Link Demodulation Reference Signal (DL_DMRS), a Channel State Information-RS (CSI-RS), a Down Link Phase Noise Tracking RS (DL PTRS), and a Timing Reference Signal (TRS), among which the DL DMRS is mainly used for demodulation of downlink data, and the DL PTRS is mainly used for estimation of phase noise in the downlink to improve the performance. There are multiple types of CSI-RS, including a CSI-RS for beam management and a CSI-RS for CSI measurement of a downlink channel. The TRS is mainly used for tracking a time frequency deviation. The uplink pilots include an Up Link Demodulation Reference Signal (UL DMRS), a Sounding Reference Signal (SRS), and a UL PTRS, among which the UL DMRS is mainly used for demodulation of uplink data, the SRS is mainly used for uplink CSI measurement, and the UL PTRS is mainly used for uplink estimation of phase noise to improve the performance. These pilots may have multiple configurations in various aspects, such as a density, a position, a power, a period, a multiplexing manner, an orthogonal code, the number of ports, a Quasi-Co-Location (QCL) relationship, etc.

SUMMARY

Due to the resource utilization rate, it is very hard to completely ensure that when these RSs are sent, no conflict is present between the RSs as well as between the RS and a channel. Because of these conflicts, how to send or receive the pilot cannot be determined correctly.

In view of this, embodiments of the present disclosure are intended to provide a method and apparatus for sending a signal, a method and apparatus for receiving a signal, and a storage medium.

The embodiments of the present disclosure provide a method for sending a signal, including that: multiple sending manners or conflict processing manners are configured or appointed for a first signal; when there is a second signal conflicting with the first signal, a sending manner or a conflict processing manner is selected for the first signal according to determination information; and the first signal is sent according to the sending manner or the conflict processing manner.

The embodiments of the present disclosure also provide a method for receiving a signal, including that: multiple receiving manners or conflict processing manners are configured or appointed for a first signal; when there is a second signal conflicting with the first signal, a receiving manner or a conflict processing manner is selected for the first signal according to determination information; and the first signal is received according to the receiving manner or the conflict processing manner.

The embodiments of the present disclosure also provide an apparatus for sending a signal, including: a preprocessing module, configured to configure or appoint multiple sending manners or conflict processing manners for a first signal; a selection module, configured to select, when there is a second signal conflicting with the first signal, a sending manner or a conflict processing manner for the first signal according to determination information; and a sending module, configured to send the first signal according to the sending manner or the conflict processing manner.

The embodiments of the present disclosure also provide an apparatus for receiving a signal, including: a preprocessing module, configured to configure or appoint multiple receiving manners or conflict processing manners for a first signal; a selection module, configured to select, when there is a second signal conflicting with the first signal, a receiving manner or a conflict processing manner for the first signal according to determination information; and a receiving module, configured to receive the first signal according to the receiving manner or the conflict processing manner.

The embodiments of the present disclosure also provide a storage medium, which stores a computer program; and the computer program, when being executed, is configured to perform the method for sending the signal provided by the embodiments of the present disclosure.

The embodiments of the present disclosure also provide a storage medium, which stores a computer program; and the computer program, when being executed, is configured to perform the method for receiving the signal provided by the embodiments of the present disclosure.

The embodiments of the present disclosure also provide an apparatus for sending a signal, including: a memory and a processor.

The memory is configured to store a program for sending the signal.

The processor is configured to execute the program; and the program, when being executed, is configured to perform the method for sending the signal provided by the embodiments of the present disclosure The embodiments of the present disclosure also provide an apparatus for receiving a signal, including: a memory and a processor.

The memory is configured to store a program for receiving the signal.

The processor is configured to execute the program; and the program, when being executed, is configured to perform the method for sending the signal provided by the embodiments of the present disclosure.

By applying the embodiments of the present disclosure, when there is a second signal conflicting with the first signal, a sending manner or a conflict processing manner is selected for the first signal according to determination information, such that the technical problem of an excessively low resource utilization rate during the sending of signals having a conflict in the relevant art is solved, the sending flexibility when signals are in conflict is improved, and the resource utilization rate is improved.

DETAILED DESCRIPTION OF THE EMBODIMENTS

The present disclosure is described below in detail with reference to the accompanying drawings and in combination with the embodiments. It is to be noted that the embodiments of the present disclosure and the characteristics of the embodiments may be combined with each other if there is no conflict.

It is to be noted that, terms such as "first" and "second" in the specification, claims and accompanying drawings of the present disclosure are only used to distinguish similar objects and are unnecessary to describe a special order or a precedence order.

For the purpose of correctly determining how to send or receive a pilot, a sending priority may be preset according to a type of a signal or a channel; and in case of resource collision, a signal or a channel having a high priority is sent preferentially at a position where the collision happens. However, a sending strategy determined completely according to the type of the channel or the signal is not flexible, and the resource utilization rate is not high.

Figure 1:
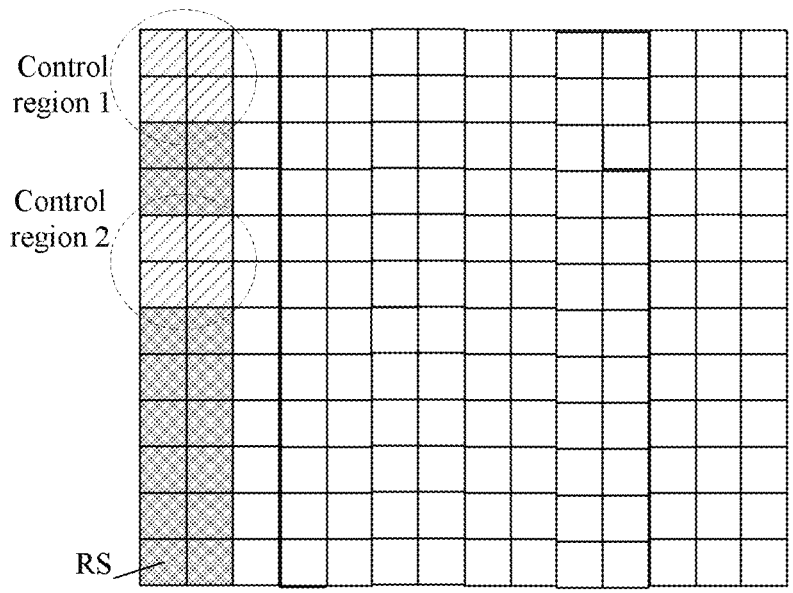
FIG. 1 is a schematic diagram of a signal conflict provided by an embodiment of the present disclosure.

For example, there may be a conflict between a potential control region and some RSs, as shown in FIG. 1, which is a schematic diagram of a signal conflict provided by an embodiment of the present disclosure. Within a control region Control-Resource Set (CORESET) configured for a terminal, no matter whether Downlink Control Signaling (DCI) is sent, multiple types of RSs such as a Channel State Information Reference Signal (CSI-RS) and a Tracking Reference Signal (TRS) cannot be configured, and this causes the resource waste.

On the uplink, though a position where the uplink SRS is in conflict with an uplink Physical Uplink Control Channel (PUCCH) may be different from the position where a conflict may happen in the downlink, the essence of the problems is the same. That is, there is also resource waste in the uplink.

A method for sending a signal and a method for receiving a signal provided by the embodiments of the present disclosure are described below. A network architecture in which the embodiments of the present disclosure may be implemented includes: a sending terminal and a receiving terminal. The sending terminal performs signal interaction with the receiving terminal.

Figure 2:
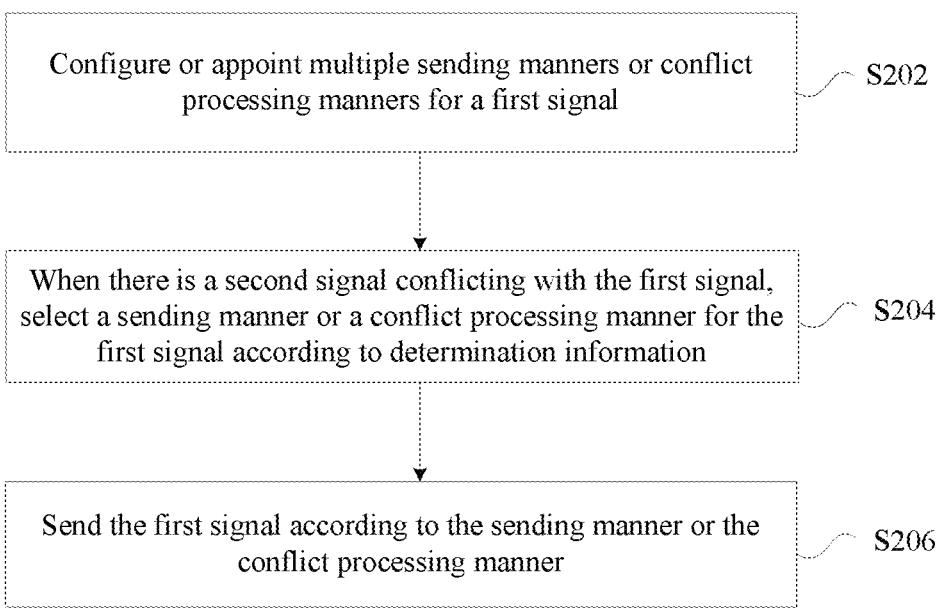
FIG. 2 is a flowchart of a method for sending a signal provided by an embodiment of the present disclosure.

An embodiment of the present disclosure provides a method for sending a signal that runs on the network architecture. FIG. 2 is a flowchart of a method for sending a signal provided by an embodiment of the present disclosure. As shown in FIG. 2, the method includes the following operations.

At S202, multiple sending manners or conflict processing manners are configured or appointed for a first signal.

At S204, when there is a second signal conflicting with the first signal, a sending manner or a conflict processing manner is selected for the first signal according to determination information.

At S206, the first signal is sent according to the sending manner or the conflict processing manner.

By means of the above operations, when there is a second signal conflicting with the first signal, a sending manner or a conflict processing manner is selected for the first signal according to determination information, such that the technical problem of an excessively low resource utilization rate during the sending of signals having a conflict in the relevant art is solved, the sending flexibility when signals are in conflict is improved, and the resource utilization rate is improved.

In an embodiment, an executor of the above operations may be a base station or a terminal, such as a transmitter but is not limited thereto.

In an embodiment, the determination information may include at least one of:
- a trigger manner and a signal type of the first signal;
- the number of resources contained in a time slot where a current sending resource is located;
- the number of resources occupied by the first signal;
- the number of resources occupied by the second signal;
- a QCL configuration for the first signal and the second signal;
- a parameter set (i.e., a numerology parameter) of the first signal and/or the second signal, a set of parameters newly pushed forward by the numerology parameter standard organization including a subcarrier interval, a symbol length, etc.;
- a communication frequency point of the first signal; and
- a bandwidth configuration of a carrier to which the first signal belongs.

The number of resources may include at least one of: the number of time domain resources, and the number of frequency domain resources.

In an embodiment, the QCL configuration for the first signal and the second signal may include at least one of:
- a QCL configuration for the first signal and the second signal themselves, and a QCL configuration for a demodulation RS of the first signal and a demodulation RS of the second signal.

In an embodiment, the bandwidth configuration may include at least one of: an uplink bandwidth, a downlink bandwidth, and a Full-power Bandwidth (BWP).

In an embodiment, the second signal may include a control signal; and the number of resources occupied by the second signal may include: the number of resources occupied by a control resource set of a control channel.

In an embodiment, when the first signal is a downlink signal, the number of resources contained in the time slot where the current sending resource is located is the number of downlink resources. When the first signal is an uplink signal, the number of resources contained in the time slot where the current sending resource is located is the number of uplink resources.

Figure 3:
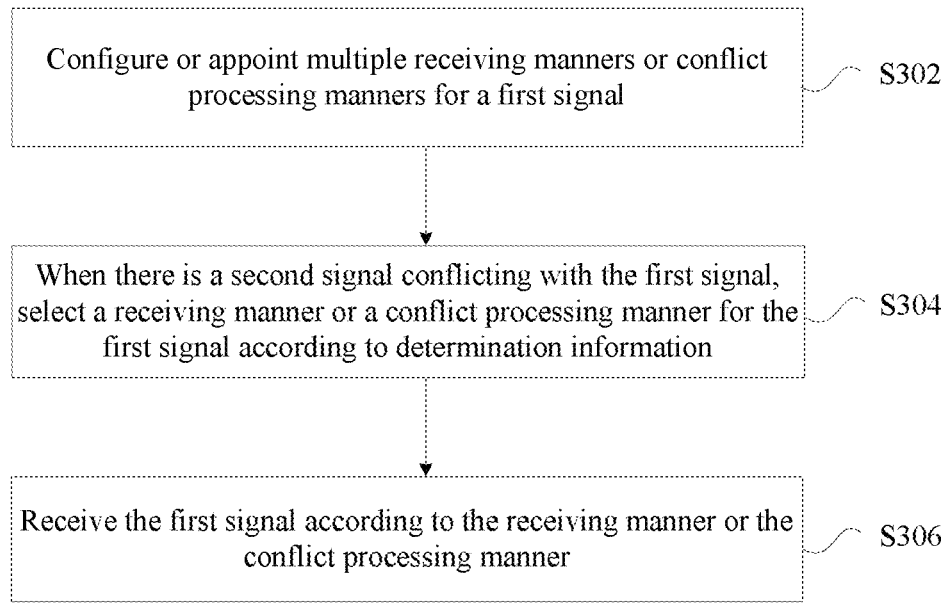
FIG. 3 is a flowchart of a method for receiving a signal provided by an embodiment of the present disclosure.

An embodiment of the present disclosure provides a method for receiving a signal that can be implemented in the network architecture. FIG. 3 is a flowchart of a method for receiving a signal provided by an embodiment of the present disclosure. As shown in FIG. 3, the method includes the following operations.

At S302, multiple receiving manners or conflict processing manners are configured or appointed for a first signal.

At S304, when there is a second signal conflicting with the first signal, a receiving manner or a conflict processing manner is selected for the first signal according to determination information.

At S306, the first signal is received according to the receiving manner or the conflict processing manner.

In an embodiment, the determination information may include at least one of:
- a trigger manner and a signal type of the first signal;
- the number of resources contained in a time slot where a current sending resource is located;
- the number of resources occupied by the first signal;
- the number of resources occupied by the second signal;
- a QCL configuration for the first signal and the second signal;
- a numerology parameter of the first signal and/or the second signal;
- a communication frequency point of the first signal; and
- a bandwidth configuration of a carrier to which the first signal belongs.

The number of resources may include at least one of: the number of time domain resources, and the number of frequency domain resources; and the second signal is a signal that is not able to be sent simultaneously with the first signal on a sending resource.

By means of the above-mentioned descriptions on the implementation manner, the person skilled in the art may clearly understand that the present disclosure may be implemented by software plus a necessary universal hardware platform, and may also be implemented by hardware certainly, but under most conditions, the former is a better implementation manner. Based on such an understanding, the technical solutions of the present disclosure essentially, or the part contributing to the conventional art may be implemented in a form of a software product. The computer software product is stored in a storage medium (such as a Read-Only Memory (ROM)/a Random Access Memory (RAM), a magnetic disk, and an optical disc) and may include a plurality of instructions for instructing a terminal device (which may be a mobile phone, a computer, a server, or a network device, etc.) to execute the methods described in the embodiments of the present disclosure.

An embodiment also provides an apparatus for sending a signal and an apparatus for receiving a signal. The apparatuses are configured to implement the above embodiments. A content that has been described will no longer be repeated. As used below, the term "module" may implement a combination of software and/or hardware having a predetermined function. Although the apparatus described in the following embodiments is implemented by software preferably, the implementation of hardware or a combination of the software and the hardware may also be conceivable.

Figure 4:
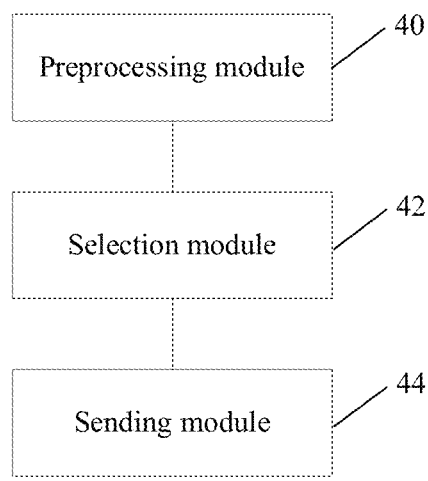
FIG. 4 is a structural block diagram of an apparatus for sending a signal provided by an embodiment of the present disclosure.

FIG. 4 is a structural block diagram of an apparatus for sending a signal provided by an embodiment of the present disclosure. As shown in FIG. 4, the apparatus includes: a preprocessing module 40, a selection module 42 and a sending module 44.

The preprocessing module 40 is configured to configure or appoint multiple sending manners or conflict processing manners for a first signal.

The selection module 42 is configured to select, when there is a second signal conflicting with the first signal, a sending manner or a conflict processing manner for the first signal according to determination information.

The sending module 44 is configured to send the first signal according to the sending manner or the conflict processing manner.

Figure 5:
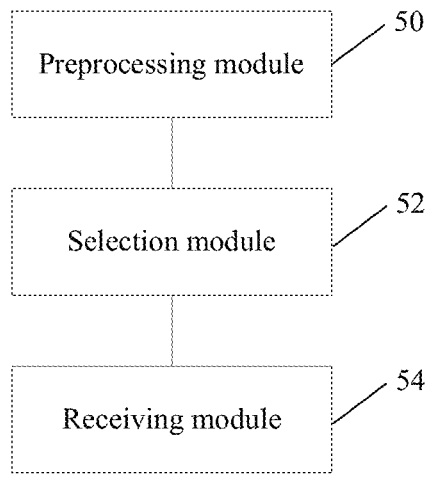
FIG. 5 is a structural block diagram of an apparatus for receiving a signal provided by an embodiment of the present disclosure.

FIG. 5 is a structural block diagram of an apparatus for receiving a signal provided by an embodiment of the present disclosure. As shown in FIG. 5, the apparatus includes: a preprocessing module 50, a selection module 52 and a receiving module 54.

The preprocessing module 50 is configured to configure or appoint multiple receiving manners or conflict processing manners for a first signal.

The selection module 52 is configured to select, when there is a second signal conflicting with the first signal, a receiving manner or a conflict processing manner for the first signal according to determination information.

The receiving module 54 is configured to receive the first signal according to the receiving manner or the conflict processing manner.

It is to be noted that each module may be implemented by software or hardware. The latter may be implemented via the following manner but is not limited thereto: the above modules are located in the same processor; or the above modules are respectively located in different processors in any combination form.

Figure 6:
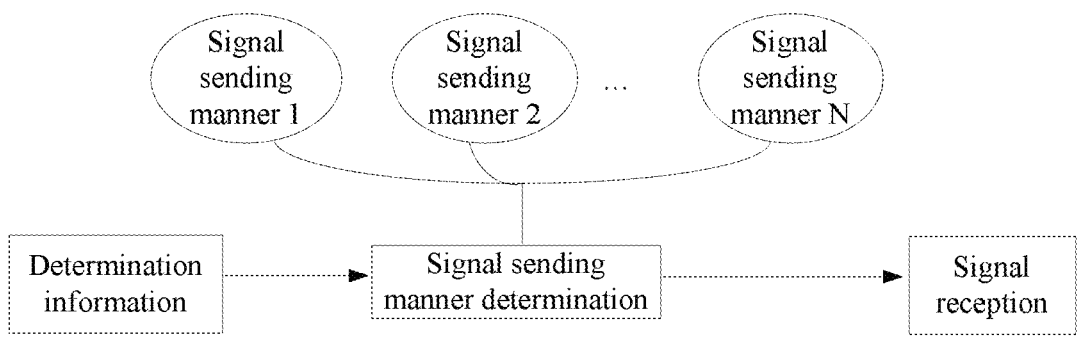
FIG. 6 is a schematic diagram for sending a signal and receiving a signal provided by an embodiment of the present disclosure.

The solutions of the embodiment include two aspects, namely, the method for sending the signal and the method for receiving the signal. One or more configurations are allowed for the control region. A discrete control region is possible to occupy more frequency domain resources and support multiple users for sharing. However, whether the DCI is sent in the control region in each time slot and whether the control region is occupied fully may change dynamically. In a case where no resource is occupied, or in a case where a part of resources in the control region is available, the RS should be allowed to be sent. FIG. 6 is a schematic diagram for sending a signal and receiving a signal provided by the embodiment.

The method for sending the signal includes the following operations.

At 101, a sending terminal configures multiple sending manners of a signal, or a sending terminal and a receiving terminal appoints multiple sending manners of a signal.

In an embodiment, the multiple sending manners may include conflict processing manners when the signal is in collision with other signals.

At 102, a sending manner of the signal is selected according to determination information.

In an embodiment, the determination information may include one or more of:
- "a trigger manner and a signal type of a to-be-sent signal";
- "the number of resources contained in a current time slot", where the resource may be a time domain and/or frequency domain resource;
- "the number of resources occupied by the to-be-sent signal", where the resource may be the time domain and/or frequency domain resource;
- "the number of resources occupied by a conflicting signal", where the resource may be the time domain and/or frequency domain resource;
- "a QCL configuration for the to-be-sent signal and the conflicting signal";
- "a numerology parameter of the to-be-sent signal and/or the conflicting signal";
- "a communication frequency point of the to-be-sent signal"; and "a bandwidth configuration of a carrier to which the to-be-sent signal belongs".

In an embodiment, when the to-be-sent signal is a downlink signal, the number of resources contained in the current time slot is the number of downlink resources contained in the time slot.

In an embodiment, when the to-be-sent signal is an uplink signal, the number of resources contained in the current time slot is the number of uplink resources contained in the time slot.

In an embodiment, the QCL configuration for the to-be-sent signal and the conflicting signal may include: a QCL configuration for "the to-be-sent signal or a demodulation RS of the to-be-sent signal" and a QCL configuration for "the conflicting signal or a demodulation RS of the conflicting signal".

In an embodiment, the bandwidth configuration of the carrier to which the to-be-sent signal belongs may include: an uplink bandwidth, a downlink bandwidth and a BWP.

In an embodiment, the conflicting signal is a control signal, and the "the number of resources occupied by the conflicting signal" is the number of resources occupied by a control channel CORESET.

At 103, the signal is sent according to the selected signal sending manner.

The method for receiving the signal includes the following operations.

At 201, multiple sending manners of a signal are determined according to a configuration of a sending terminal or an appointment between the sending terminal and a receiving terminal.

In an embodiment, the multiple sending manners include conflict processing manners when the signal is in collision with other signals.

At 202, a sending manner of the signal is selected according to determination information.

The determination information may include: "a trigger manner and a signal type of a to-be-sent signal";
"the number of resources contained in a current time slot", where the resource may be a time domain and/or frequency domain resource;
"the number of resources occupied by the to-be-sent signal", where the resource may be the time domain and/or frequency domain resource;
"the number of resources occupied by a conflicting signal", where the resource may be the time domain and/or frequency domain resource;
"a QCL configuration for the to-be-sent signal and the conflicting signal";
"a numerology parameter of the to-be-sent signal and/or the conflicting signal";
"a communication frequency point of the to-be-sent signal"; and
"a bandwidth configuration of a carrier to which the to-be-sent signal belongs".

In an embodiment, when the to-be-sent signal is a downlink signal, the number of resources contained in the current time slot is the number of downlink resources contained in the time slot.

In an embodiment, when the to-be-sent signal is an uplink signal, the number of resources contained in the current time slot is the number of uplink resources contained in the time slot.

In an embodiment, the QCL configuration for the to-be-sent signal and the conflicting signal may include: a QCL configuration for "the to-be-sent signal or a demodulation RS of the to-be-sent signal" and a QCL configuration for "the conflicting signal or a demodulation RS of the conflicting signal".

In an embodiment, the bandwidth configuration of the carrier to which the to-be-sent signal belongs may include: an uplink bandwidth, a downlink bandwidth and a BWP.

In an embodiment, the conflicting signal is a control signal, and the "the number of resources occupied by the conflicting signal" is the number of resources occupied by a control channel CORESET.

At 203, the signal is received according to the selected signal sending manner.

In the embodiment, when the to-be-sent signal is in conflict with other signals (for example, the first signal is in conflict with the second signal in the above embodiment), a variety of processing manners may be provided, including: a processing manner A, a processing manner B and a processing manner C.

The processing manner A is to puncture (not to send) a portion, located at the conflicting position, of the RS.

The processing manner B is to change a sending parameter configuration of one or more RSs. For example, a processing manner B1 is to change a frequency domain sending position or a time domain sending position of one or more RSs; a processing manner B2 is to change a sending density of one or more RSs; a processing manner B3 is to change a sending power of one or more RSs; a processing manner B4 is to change a sending port of one or more RSs; a processing manner B5 is to change a sending sequence of one or more RSs; and a processing manner B6 is to change an orthogonal code configuration of one or more RSs.

The processing manner C is not to puncture the to-be-sent signal, that is, the to-be-sent signal is not processed, and the to-be-sent signal may be subjected to space division with the conflicting signal. Alternatively, this processing manner may be a sending manner in which the conflicting signal is punctured or the conflicting signal is processed (changed).

Which manner is used may be determined according to the trigger manner and the signal type of the to-be-sent signal.

For example, when the CSI-RS is in conflict with the control signal, there may be the following cases.

When a periodic CSI-RS is in conflict with a downlink control signal, a preferable processing manner is the processing manner A/B.

When a non-periodic CSI-RS is in conflict with a downlink control signal, a preferable processing manner is the processing manner C.

For example, when the SRS is in conflict with the control signal, there may be the following cases.

When a periodic SRS is in conflict with an uplink control signal, a preferable processing manner is the processing manner A/B.

When a non-periodic SRS is in conflict with an uplink control signal, a preferable processing manner is the processing manner C.

As a non-periodic RS is triggered dynamically and a periodic RS is triggered semi-statically, if the non-periodic RS is triggered by a symbol in a control region, it may be considered that the base station finds out that the corresponding position for the RS in the region is not occupied in the current time slot. Additionally, the number of sending times of the non-periodic CSI-RS is small, therefore the non-periodic CSI-RS has a larger impact than the periodic signal if punctured.

Which manner is used may be determined according to "the number of resources contained in the current time slot".

The number of resources contained in the current time slot may refer to time domain resources, and/or frequency domain resources, and may specifically refer to time domain symbols, frequency domain subcarriers, or Resource Elements (REs), Resource Blocks (RBs), etc.

The fewer the number of resources contained in the time slot, the poorer the tolerance for the resource waste. Therefore, a resource number threshold T may be set. If the number of resources contained in the time slot is greater than the T, when the RS is in conflict with the control signal, the conflict processing manner A is used; and if the number of resources contained in the time slot is smaller than the T, the conflict processing manner C is used.

When the to-be-sent signal is a downlink signal, the number of resources contained in the current time slot is the number of downlink resources contained in the time slot.

When the to-be-sent signal is an uplink signal, the number of resources contained in the current time slot is the number of uplink resources contained in the time slot.

Which manner is used may be determined according to "the number of resources occupied by the to-be-sent signal".

The fewer the number of resources occupied by the to-be-sent signal, the larger the impact on the performance. Therefore, a resource number threshold T1 may be set. If the number of resources occupied by the to-be-sent signal is greater than the T1, when the RS is in conflict with the control signal, the conflict processing manner A is used; and if the number of resources occupied by the to-be-sent signal is smaller than the T1, the conflict processing manner C is used.

Which manner is used may be determined according to "the number of resources occupied by the conflicting signal".

The fewer the number of resources occupied by the conflicting signal, the larger the impact on the performance. Therefore, a resource number threshold T2 may be set. If the number of resources occupied by the conflicting signal is greater than the T2, when the RS is in conflict with the control signal, the conflict processing manner C is used; and if the number of resources occupied by the conflicting signal is smaller than the T2, the conflict processing manner A is used.

For example, if the CSI-RS occupies multiple symbols and the front one symbol in the multiple symbols is in conflict with the control region, the impact of such a case on the CSI-RS is not very large, and the conflict processing manner A may be used. However, if the CSI-RS only occupies one symbol and is the non-periodic CSI-RS, the impact of puncturing the CSI-RS is relatively large, and in such a case the conflict processing manner C may be used.

Also for example, if the CSI-RS is sent on 100 RBs, and only 4 RBs have the conflict with the control region, the impact of such a case on the CSI-RS is not very large, and the conflict processing manner A may be used. If the CSI-RS is only sent on 10 RBs, and 4 RBs have the conflict with the control region, the impact of such a case on the CSI-RS is large, and the conflict processing manner C may be used.

Which manner is used may be determined according to "the QCL configuration for the to-be-sent signal and the conflicting signal".

For example, the QCL configuration for the to-be-sent signal and the conflicting signal may characterize beams sent by the to-be-sent signal and the conflicting signal. If the orthogonality of the signals is good, the signals may be sent simultaneously, and the processing manner C is used. If the two signals have close beam directions, the manner A or B is used.

Herein, the QCL configuration for the to-be-sent signal and the conflicting signal may include: a QCL configuration for "the to-be-sent signal or a demodulation RS of the to-be-sent signal" and a QCL configuration for "the conflicting signal or a demodulation RS of the conflicting signal".

Which manner is used may be determined according to "the communication frequency point of the to-be-sent signal".

For the conflict between the RS and the control signal, different processing manners may be used at different communication frequency points. For example, the manner A is used for the low frequency, and the manner C is used for the high frequency.

Which manner is used may be determined according to "the numerology parameter of the to-be-sent signal and/or the conflicting signal".

The numerology parameter refers to basic transmission parameters in communication, and may include but not limited to the following types of transmission parameters:
- time domain symbol length which refers to a length of an Orthogonal Frequency Division Multiplexing (OFDM) symbol;
- the number of subcarriers which refers to the number of subcarriers, which carry a modulation symbol in a frequency domain, corresponding to the same OFDM symbol;
- subcarrier interval which refers to an interval between central frequencies of subcarriers; and
- the number of Fast Fourier Transformation (FFT) points which is generally related with the number of subcarriers and a bandwidth of a baseband, but is not completely equivalent to the number of effective subcarriers of the baseband.

Different numerology parameters are generally used in different situations. For example, a large subcarrier interval and a short time domain symbol length are used for the high frequency situation. In a case of a large bandwidth, the number of FFT points is relatively large, and the number of subcarriers is relatively large. The low frequency situation is the other way around. Therefore, which manner is used in the case of the signal conflict may be determined according to the frequencies, which may be reflected by the numerology parameter.

Which manner is used may be determined according to "the bandwidth of the carrier to which the sending signal belongs". The bandwidth of the carrier to which the sending signal belongs may include: an uplink bandwidth, a downlink bandwidth and a BWP.

An embodiment of the present disclosure also provides a storage medium, which stores a computer program; and the computer program, when being executed, is configured to perform the method for sending the signal provided by the embodiments of the present disclosure.

Correspondingly, an embodiment of the present disclosure also provides a storage medium, which stores a computer program; and the computer program, when being executed, is configured to perform the method for receiving the signal provided by the embodiments of the present disclosure.

In an embodiment, the storage medium may be configured to store a computer program for executing the following operations:

At S1, multiple sending manners or conflict processing manners are configured or appointed for a first signal.

At S2, when there is a second signal conflicting with the first signal, a sending manner or a conflict processing manner is selected for the first signal according to determination information.

At S3, the first signal is sent according to the sending manner or the conflict processing manner.

In an embodiment, the storage medium may include but not limited to: a variety of media capable of storing the computer program such as a U disk, an ROM, an RAM, a mobile hard disk, a magnetic disk or an optical disc.

An embodiment of the present disclosure also provides an apparatus for sending a signal, including: a memory and a processor.

The memory is configured to store a program for sending the signal.

The processor is configured to execute the program; and the program, when being executed, is configured to perform the method for sending the signal provided by the embodiments of the present disclosure.

An embodiment of the present disclosure also provides an apparatus for receiving a signal, including: a memory and a processor.

The memory is configured to store a program for receiving the signal.

The processor is configured to execute the program; and the program, when being executed, is configured to perform the method for sending the signal provided by the embodiments of the present disclosure.

In an embodiment, the sending/receiving apparatus may further include a transmission device and an input/output device, and the transmission device is connected to the processor, and the input/output device is connected to the processor.

In an embodiment, the processor may be configured to execute the following operations through a computer program.

At S1, multiple sending manners or conflict processing manners are configured or appointed for a first signal.

At S2, when there is a second signal conflicting with the first signal, a sending manner or a conflict processing manner is selected for the first signal according to determination information.

At S3, the first signal is sent according to the sending manner or the conflict processing manner.

It is apparent that those skilled in the art should understand that the above-mentioned operations of the present disclosure may be implemented by a general-purpose computing device, and they may be centralized on a single computing device or distributed on a network composed of multiple computing devices. In some exemplary embodiments, they may be implemented with program codes executable by a computing device, so that they may be stored in a storage device and executed by the computing device, and in some cases, the operations shown or described may be performed in a different order than here, or they are separately made into individual integrated circuit modules, or multiple operations therein are made into a single integrated circuit module for implementation. As such, the present disclosure is not limited to any particular combination of hardware and software.

The above are only the exemplary embodiments of the present disclosure, and are not intended to limit the present disclosure. As will occur to those skilled in the art, the present disclosure is susceptible to various modifications and changes. Any modifications, equivalent replacements, improvements and the like made within the principle of the present disclosure shall fall within the scope of protection of the present disclosure.

What is claimed is:

1. A method for sending a signal, comprising:
configuring or appointing multiple conflict processing manners for a first reference signal;
when there is a second reference signal conflicting with the first reference signal, selecting a conflict processing manner for the first reference signal according to determination information; and
sending the first reference signal according to the conflict processing manner, wherein the conflict processing manners comprises one of:
puncturing a portion, located at a conflicting position, of the first reference signal;
changing a sending parameter configuration of the first reference signal;
performing space division on the first reference signal and the second reference signal;
wherein the determination information comprises the number of resources occupied by the first reference signal, and when the second reference signal conflicts with the first reference signal, selecting a conflict processing manner for the first reference signal according to determination information comprises:
when the number of resources occupied by the first reference signal is greater than a threshold, puncturing a portion, located at a conflicting position, of the first reference signal, and when the number of resources occupied by the first reference signal is smaller than the threshold, performing space division on the first reference signal and the second reference signal.

2. A method for receiving a signal, comprising:
configuring or appointing multiple conflict processing manners for a first reference signal;
when there is a second reference signal conflicting with the first reference signal, selecting a conflict processing manner for the first reference signal according to determination information; and
receiving the first reference signal according to the conflict processing manner, wherein the conflict processing manners comprises one of:
puncturing a portion, located at a conflicting position, of the first reference signal;
changing a sending parameter configuration of the first reference signal;
performing space division on the first reference signal and the second reference signal;
wherein the determination information comprises the number of resources occupied by the first reference signal, and when the second reference signal conflicts with the first reference signal, selecting a conflict processing manner for the first reference signal according to determination information comprises:
when the number of resources occupied by the first reference signal is greater than a threshold, puncturing a portion, located at a conflicting position, of the first reference signal, and when the number of resources occupied by the first reference signal is smaller than the threshold, performing space division on the first reference signal and the second reference signal.

3. A non-transitory storage medium, storing a computer program, wherein the computer program, when being executed, is configured to perform the method for sending the signal as claimed in claim 1.

4. A non-transitory storage medium, storing a computer program, wherein the computer program, when being executed, is configured to perform the method for receiving the signal as claimed in claim 2.

5. An apparatus for sending a signal, comprising:
a memory, configured to store a program for sending the signal; and
a processor, configured to execute the program, wherein the program, when being executed, is configured to perform the method for sending the signal as claimed in claim 1.

6. An apparatus for receiving a signal, comprising:
a memory, configured to store a program for receiving the signal; and
a processor, configured to execute the program, wherein the program, when being executed, is configured to perform the method for receiving the signal as claimed in claim 2.

7. The method as claimed in claim 1, wherein the sending parameter configuration comprises at least one of:
configuration of a frequency domain sending position or a time domain sending position;
configuration of a sending density;
configuration of a sending power;
configuration of a sending port;
configuration of a sending sequence of one or more first reference signals;
configuration of an orthogonal code.

8. The method as claimed in claim 2, wherein the QCL configuration for the first reference signal and the second reference signal comprises at least one of:
a QCL configuration for the first reference signal and the second reference signal themselves, and a QCL configuration for a demodulation Reference Signal (RS) of the first reference signal and a demodulation RS of the second reference signal.

9. The method as claimed in claim 2, wherein the bandwidth configuration comprises at least one of:
an upper bandwidth, a lower bandwidth, and a Full-power Bandwidth (BWP).

10. The method as claimed in claim 2, wherein the second reference signal comprises a control signal; or, the number of resources occupied by the second reference signal comprises: the number of resources occupied by a control resource set of a control channel.

11. The method as claimed in claim 2, wherein when the first reference signal is a downlink signal, the number of resources contained in the time slot where the current sending resource is located is the number of downlink resources.

12. The method as claimed in claim 2, wherein when the first reference signal is an uplink signal, the number of resources contained in the time slot where the current sending resource is located is the number of uplink resources.

13. The method as claimed in claim 2, wherein the determination information further comprises at least one of:
a trigger manner and a signal type of the first reference signal;
the number of resources contained in a time slot where a current sending resource is located;
the number of resources occupied by the first reference signal;
the number of resources occupied by the second reference signal;
a parameter set of the first reference signal and/or the second reference signal;
a communication frequency point of the first reference signal; and
a bandwidth configuration of a carrier to which the first reference signal belongs,
wherein the number of resources comprises at least one of: the number of time domain resources, and the number of frequency domain resources; and the second reference signal is a signal that is not able to be sent simultaneously with the first reference signal on a sending resource.

14. The method as claimed in claim 1, wherein the determination information further comprises at least one of:
a trigger manner and a signal type of the first reference signal;
the number of resources contained in a time slot where a current sending resource is located;
the number of resources occupied by the second reference signal;
a Quasi-Co-Location (QCL) configuration for the first reference signal and the second reference signal;
a parameter set of the first reference signal and/or the second reference signal;
a communication frequency point of the first reference signal; and
a bandwidth configuration of a carrier to which the first reference signal belongs,
wherein the number of resources comprises at least one of: the number of time domain resources, and the number of frequency domain resources.

15. The method as claimed in claim 14, wherein the QCL configuration for the first reference signal and the second reference signal comprises at least one of:
a QCL configuration for the first reference signal and the second reference signal themselves, and a QCL configuration for a demodulation Reference Signal (RS) of the first reference signal and a demodulation RS of the second reference signal.

16. The method as claimed in claim 14, wherein the bandwidth configuration comprises at least one of:
an upper bandwidth, a lower bandwidth, and a Full-power Bandwidth (BWP).

17. The method as claimed in claim 14, wherein the second reference signal comprises a control signal; or, the number of resources occupied by the second reference signal comprises: the number of resources occupied by a control resource set of a control channel.

18. The method as claimed in claim 14, wherein when the first reference signal is a downlink signal, the number of resources contained in the time slot where the current sending resource is located is the number of downlink resources.

19. The method as claimed in claim 14, wherein when the first reference signal is an uplink signal, the number of resources contained in the time slot where the current sending resource is located is the number of uplink resources.

* * * * *